United States Patent
Gupta et al.

(10) Patent No.: US 9,671,620 B2
(45) Date of Patent: Jun. 6, 2017

(54) VARIABLE FOCUS LIQUID FILLED LENS APPARATUS

(71) Applicant: Adlens Beacon, Inc., Pembroke Park, FL (US)

(72) Inventors: Amitava Gupta, Roanoke, VA (US); Karim Haroud, Chavannes-sur-Moudon (CH); Urban Schnell, Munchenbuchsee (CH)

(73) Assignee: Adiens Beacon, Inc., Pembroke Park, FL (US)

( * ) Notice: Subject to any disclaimer, the term of this patent is extended or adjusted under 35 U.S.C. 154(b) by 0 days.

(21) Appl. No.: 14/713,823

(22) Filed: May 15, 2015

(65) Prior Publication Data

US 2015/0248022 A1    Sep. 3, 2015

Related U.S. Application Data

(60) Continuation of application No. 13/763,259, filed on Feb. 8, 2013, now Pat. No. 9,033,495, which is a continuation of application No. 12/986,589, filed on Jan. 7, 2011, now Pat. No. 8,382,280, which is a division of application No. 12/370,938, filed on Feb. 13, 2009, now abandoned.

(51) Int. Cl.

| | | |
|---|---|---|
| G02C 7/00 | (2006.01) | |
| G02C 7/08 | (2006.01) | |
| G02B 3/14 | (2006.01) | |
| G02B 1/14 | (2015.01) | |
| G02B 1/11 | (2015.01) | |
| G02B 3/02 | (2006.01) | |

(52) U.S. Cl.
CPC ............. G02C 7/085 (2013.01); G02B 1/11 (2013.01); G02B 1/14 (2015.01); G02B 3/02 (2013.01); G02B 3/14 (2013.01); *G02C 2202/16* (2013.01)

(58) Field of Classification Search
CPC ...... G02C 7/085; G02C 2202/16; G02C 7/04; G02C 7/049; G02B 3/02; G02B 3/14; G02B 1/11; G02B 1/14
USPC ....... 359/557, 665, 666, 694, 808, 813, 814, 359/819, 822, 823, 824; 351/159.01, 351/159.11, 159.78, 159, 168, 172, 176, 351/159.34, 159.68
See application file for complete search history.

(56) References Cited

U.S. PATENT DOCUMENTS

| | | | |
|---|---|---|---|
| 5,684,637 A * | 11/1997 | Floyd .................... | G02C 7/085 359/666 |
| 6,288,846 B1 * | 9/2001 | Stoner, Jr. ............... | G02B 1/06 351/159.68 |
| 8,018,658 B2 * | 9/2011 | Lo ........................... | G02B 3/14 359/665 |

* cited by examiner

*Primary Examiner* — Tuyen Tra
(74) *Attorney, Agent, or Firm* — Greenberg Traurig, LLP (57) ABSTRACT

A variable focus optical apparatus including a rigid, curved, transparent optical component; two transparent, distensible membranes attached to a periphery of the rigid optical component to define two cavities, a first cavity between the rigid optical component and a first membrane and a second cavity between the first membrane and a second membrane; and a variable amount of fluid each of the cavities, and a reservoir containing additional fluid and in fluid communication with the cavity, wherein the reservoir is configured to provide injection of fluid into the cavity or withdrawal of fluid out of the cavity in response to a force or an impulse.

16 Claims, 5 Drawing Sheets

VARIABLE FOCUS LIQUID FILLED LENS APPARATUS

CROSS-REFERENCE TO RELATED APPLICATION

This application is a continuation of U.S. application Ser. No. 12/986,589, filed Jan. 7, 2011, which is a divisional of U.S. application Ser. No. 12/370,938, filed Feb. 13, 2009, the disclosures of which are incorporated by reference herein in their entirety.

BACKGROUND OF THE INVENTION

Field of the Invention

The present invention relates to the field of variable focus lenses, and more particularly to consumer ophthalmic lenses that are at least in part fluid- or liquid-filled.

Background Art

It is known that the ability of the human eye to accommodate, i.e., to alter the focal length of the natural lens in the eye, is gradually diminished with increased age. Accommodation in human beings is reduced to 3D (diopters) or less at an age range of 35-45 years. At that point, reading glasses or some other form of near vision correction becomes necessary for the human eye to be able to bring near objects (such as lines of text in a book or a magazine) to focus. With further aging, accommodation drops below 2D, and at that point visual correction when working on a computer or when performing some visual task at intermediate distances is needed.

For best results and for best visual comfort, it is necessary to bring each eye to focus on the same viewing target, e.g., a computer screen. A large segment of population requires a different visual correction for each eye. These people, known as anisometropes, require different visual correction for each eye in order to achieve maximum visual comfort while reading or working on a computer. It is known that, if each of the two eyes of anisometropes is not brought to focus at the same viewing plane, the resulting anisometropic image blur causes a loss of stereopsis (depth perception). Loss of stereopsis is one of the best indications of loss of binocular function. Loss of binocularity at the reading plane may cause a drop in reading speed and rate of comprehension, and may hasten the onset of fatigue upon sustained reading or working on a computer. Reading glasses fitted with individually adjustable liquid lenses are therefore uniquely suited for the visual need of individuals with loss of binocular function.

Variable focus lenses can take the form of a volume of liquid enclosed between flexible, transparent sheets. Typically, two such sheets, one forming the lens front surface and one forming the lens back surface, are attached to one another at their edges, either directly or to a carrier between the sheets, to form a sealed chamber containing the fluid. Both sheets can be flexible, or one can be flexible and one rigid. Fluid can be introduced into or removed from the chamber to vary its volume, and, as the volume of liquid changes, so does the curvature of the sheet(s), and thus the power of the lens. Liquid lenses are, therefore, especially well suited for use in reading glasses, that is, eye glasses used by presbyopes for reading.

Variable focus liquid lenses have been known at least since 1958 (see, e.g., U.S. Pat. No. 2,836,101, to de Swart). More recent examples may be found in Tang et al, "Dynamically Reconfigurable Liquid Core Liquid Cladding Lens in a Microfluidic Channel", LAB ON A CHIP, Vol. 8; No. 3, pp. 395-401 (2008), and in International Patent Application Publication No. WO 2008/063442, entitled "Liquid Lenses with Polycyclic Alkanes". These liquid lenses are typically directed towards photonics, digital phone and camera technology, and microelectronics.

Liquid lenses have also been proposed for consumer ophthalmic applications. See for example, U.S. Pat. Nos. 5,684,637 and 6,715,876 to Floyd, and U.S. Pat. No. 7,085,065, to Silver. These references teach pumping of liquid in or out the lens chamber to change the curvature of an elastic membrane surface, thus tuning the focus of the liquid lens. For example, U.S. Pat. No. 7,085,065, entitled "Variable Focus Optical Apparatus", teaches a variable focus lens formed from a fluid envelope comprising two sheets, at least one of which is flexible. The flexible sheet is retained in place between two rings, which are directly secured together, such as by adhesive, ultrasonic welding or any similar process, and the other, rigid sheet may be directly secured to one of the rings. A hole is drilled through the assembled lens to allow the cavity between the flexible membrane and the rigid sheet to be filled with transparent fluid.

Liquid lenses have many advantages, including a wide dynamic range, the ability to provide adaptive correction, robustness and low cost. However, in all cases, the advantages of liquid lenses must be balanced against its disadvantages, such as limitations in aperture size, possibility of leakage and inconsistency in performance. In particular, Silver has disclosed several improvements and embodiments directed towards effective containment of the fluid in the liquid lens to be used in ophthalmic applications, although not limited to them (e.g., U.S. Pat. No. 6,618,208 to Silver, and references therein). Power adjustment in liquid lenses has been effected by injecting additional fluid into a lens cavity, by electrowetting, by application of ultrasonic impulse and by utilizing swelling forces in a cross linked polymer upon introduction of a swelling agent such as water.

Commercialization of liquid lenses is expected to occur in the near future, provided that some of the limitations noted above can be remedied. Even so, the structure of prior art liquid lenses is bulky and not aesthetically suitable for consumers, who desire spectacles having thinner lenses and spectacles without bulky frames. For the lenses that operate by injection or pumping of liquid into the body of the lens, a complicated control system is usually needed, making such lenses bulky, expensive and sensitive to vibration.

In addition, to date, none of the prior art liquid lenses provides the consumer with the ability to introduce the liquid into or remove it from the lens chamber so as to himself change its volume in order to vary the power of the lens.

BRIEF SUMMARY

In accordance with the objects of the invention, a liquid-filled lens for consumer, ophthalmic applications is provided. The lens has a front member that is rigid provided by an optic made of glass or plastic, a back surface comprising a flexible membrane stretched over the edge of the rigid optic, and a fluid filling the cavity formed between the front optic and the flexible membrane. The liquid-filled lens may comprise one or more liquid filled cavities, contained by a corresponding number of membranes. Each liquid filled cavity is sealed, and is under a positive pressure in order to maintain the membrane in a stretched state. The front optic may have an aspheric surface geometry and may have a meniscus shape.

In certain embodiments, the invention provides a variable focus optical apparatus comprising a rigid, curved, transparent optical component, at least one transparent, distensible membrane attached to a periphery of the rigid optical component to define a cavity therebetween, a variable amount of fluid filling the cavity, and a reservoir containing additional fluid and in fluid communication with the cavity and being operable to provide injection of fluid into the cavity or withdrawal of fluid out of the cavity in response to a force or an impulse.

A communication channel could provide fluid communication between the reservoir and the cavity, forming a sealed system. The communication channel providing fluid communication between the reservoir and the cavity can be within a ring, within which the membrane and the periphery of the rigid optical component are at least in part to provide attachment thereto.

In other embodiments, the invention could provide a variable focus optical apparatus having two membranes attached to a periphery of said rigid optical component to define two cavities, a variable amount of fluid filling each of the cavities, and a reservoir is in fluid communication with at least one of the cavities.

In other embodiments, the invention could provide a set of eyeglasses for ophthalmic applications having at least one variable focus lens, a reservoir actuator and a frame, wherein the optical power of at least one of the lenses is separately adjustable by the wearer. In certain embodiments of the eyeglasses, the reservoir could be situated in the frame and be operable by the actuator to adjust the optical power of at least one of the lenses. In certain embodiments of the eyeglasses, the communication channel could be situated within said frame providing fluid communication between said reservoir and said cavity.

A liquid filled lens is capable of providing variation of optical power over a range of up to 4.00 D.

The present invention will be better understood by reference to the following detailed discussion of specific embodiments and the attached figures, which illustrate and exemplify such embodiments.

BRIEF DESCRIPTION OF THE DRAWINGS

Embodiments of the invention will be understood and appreciated more fully from the following detailed description in conjunction with the figures, which are not to scale, in which like reference numerals indicate corresponding, analogous or similar elements, and in which:

FIG. 1A is a schematic cross-sectional view of a first embodiment of a liquid filled lens for use in spectacles or the like;

FIG. 1B is a schematic cross-sectional view of a second embodiment of a liquid filled lens for use in spectacles or the like;

DETAILED DESCRIPTION OF THE INVENTION

The following preferred embodiments as exemplified by the drawings are illustrative of the invention and are not intended to limit the invention as encompassed by the claims of this application.

Figure 1A:
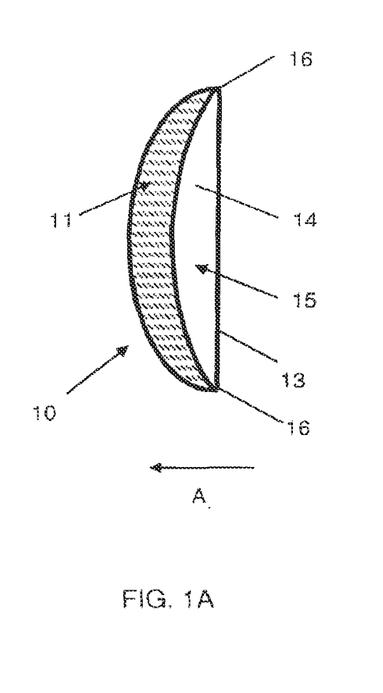

FIG. 1A shows a cross-sectional view of a first preferred embodiment of the optical apparatus, in the form of a variable focus lens 10, through which a wearer peers in the direction of arrow A. Lens 10 is a composite of two optic components, an anterior (i.e., front, with respect to the wearer) optic 11 that is substantially rigid and a posterior (i.e., back, with respect to the wearer) optic 15 that is a liquid.

Anterior optic 11 is a substantially rigid lens preferably made of a rigid, transparent substrate, such as a clear plastic or poly carbonate, glass plate, transparent crystal plate, or a transparent rigid polymer, for example, Polycarbonate of Bisphenol A or CR-39 (Diethylene glycol bisallyl carbonate). Anterior optic 11 may be made of an impact resistant polymer and may have a scratch resistant coating or an antireflective coating.

In a preferred embodiment, anterior optic 11 has a meniscus shape, i.e., convex at its front side and concave at its back side. Thus, both the front and the back surfaces of anterior optic 11 are curved in the same direction. However, as in all lenses that correct presbyopia (inability to accommodate), anterior optic 11 is thicker in the center and thinner at the edge, i.e., the radius of curvature of the front surface of anterior optic 11 is smaller than the radius of curvature of the back surface of anterior optic 11, such that the respective radii of curvature of the front and the back surfaces of anterior optic 11, and hence the front and the back surfaces themselves, intersect. The intersection of the front and the back surfaces of anterior optic 11 is the circumferential edge 16 of anterior optic 11.

In certain embodiments, the front surface of anterior optic 11 is spherical, meaning it has the same curve across its entire surface, as in conventional eyeglasses lenses. In a preferred embodiment, anterior optic 11 is aspheric and has a more complex front surface curvature that gradually changes from the center of the lens out to the edge, so as to provide a slimmer profile and a desired power profile as a function of the gaze angle, the gaze angle being defined herein as the angle formed between the actual line of sight and the principal axis of the lens.

Posterior optic 15 is a liquid lens composed of a fluid 14. Fluid 14 is confined within a cavity formed between the back surface of the anterior optic 11 and a membrane 13 that is attached to the edges of anterior optic 11. Membrane 13 is preferably made of a flexible, transparent, water impermeable material, such as clear and elastic polyolefins, polycycloaliphatics, polyethers, polyesters, polyimides and polyurethanes, for example, polyvinylidene chloride films, including commercially available films, such as those manufactured as Mylar® or Saran®. It has been found that a proprietary clear transparent film made of Polyethylene terephthalate is one preferred choice for the membrane.

The cavity between the back surface of the anterior optic 11 and a membrane 13 in FIG. 1A is formed by sealing membrane 13 to the periphery or circumferential edge 16 of the anterior optic 11. Membrane 13 may be sealed to anterior optic 11 by any known method, such as heat sealing, adhesive sealing or laser welding. Membrane 13 can be is at least in part bonded to a support element that is in turn bonded to the periphery of anterior optic 11. Membrane 13 is preferably flat when sealed but may be thermoformed to a specific curvature or spherical geometry.

Fluid 14 encapsulated between membrane 13 and the back surface of the anterior optic 11 is preferably colorless. However, fluid 14 can be tinted, depending on the application, such as if the intended application is for sunglasses. Fluid 14 having an appropriate index of refraction and viscosity suitable for use in fluid filled lenses, such as, for example, degassed water, mineral oil, glycerin and silicone products, among others that are commonly known or used for fluid filled lenses. One preferred fluid 14 is manufactured by Dow Corning® under the name 704 diffusion pump oil, also generally referred to as silicone oil.

In certain embodiments, membrane 13 by itself has no constraints in its optical properties. In other embodiments, membrane 13 has constraints in its optical properties, e.g., an index of refraction, that matches the optical properties of fluid 14.

In use, at least one lens 10 is fit within a set of eyeglass or spectacle frames for use by a wearer. As shown in FIG. 1A, in profile, lens 10 allows the user to see through both anterior optic 11 and posterior optic 15, which together provide a thicker profile at the center of lens 10, and stronger presbyopic visual correction, than just anterior optic 11. The wearer is provided with the ability to adjust the amount of fluid 14 within posterior optic 15 and thereby adjust the refractive power of lens 10. In certain embodiments, as will be discussed below, the frame is equipped with a reservoir of excess fluid 14 and a fluid line communicating the reservoir to the posterior optic 15 of lens 10. The spectacles frame also preferably has an adjustment mechanism to allow the wearer to personally adjust the amount of fluid 14 within posterior optic 15 so that fluid 14 that can be moved into or expelled from the reservoir into the posterior optic 15 to thereby adjust the refractive power of lens 10 as needed.

Figure 1B:
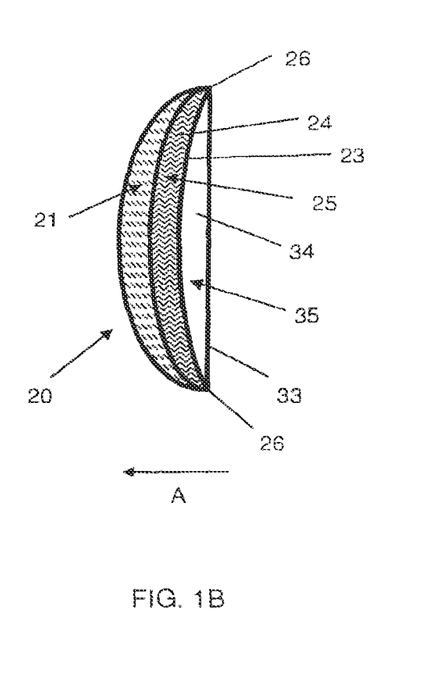

FIG. 1B shows a cross-sectional view of a second preferred embodiment of the optical apparatus, in the form of a variable focus lens 20, through which a wearer gazes in the direction of arrow A. As opposed to lens 10 in FIG. 1A, which is a composite of two optic components, lens 20 in FIG. 1B is a composite of three optic components, namely, an anterior optic 21 that is substantially rigid, an intermediate optic 25 that is a liquid and a posterior optic 35 that is a liquid.

Anterior optic 21 is a substantially rigid lens, similar in structure and design to that of anterior optic 11 of the embodiment shown in FIG. 1A. As in anterior optic 11 of FIG. 1A, anterior optic 21 also has a meniscus shape, i.e., both the front and the back surfaces of anterior optic 11 are curved in the same direction, and the radius of curvature of the front surface of anterior optic 21 is smaller than the radius of curvature of the back surface of anterior optic 21, such that the intersection of the front and the back surfaces of anterior optic 21 is the circumferential edge 26 of anterior optic 21. However, the radius of curvature of the back surface of anterior optic 21 is larger than the radius of curvature of the back surface of anterior optic 11 of FIG. 1A. Similarly, as compared to anterior optic 11 of FIG. 1A, anterior optic 21 may be somewhat thinner than anterior optic 11 of FIG. 1A, so as to maintain the same general overall thickness of lens 20 as compared to lens 10 of FIG. 1A.

Intermediate optic 25 is a liquid lens composed of a fluid 24, similar to fluid 14 as described with respect to FIG. 1A, that is confined within a cavity formed between the back surface of the anterior optic 21 and a membrane 23 that is attached to the edges 26 of anterior optic 21 and is similar in structure and design to that of membrane 13 of the embodiment shown in FIG. 1A. Fluid 24 has a selected refractive index (n.sub.23).

It is preferred that intermediate optic 25 also have a meniscus shape, such that both its front and back surfaces are curved in the same direction. Naturally, the back surface of rigid anterior optic 21 may be formed with a curvature during manufacture. However, the concave curvature of membrane 23 may be accomplished by thermoforming it to a specific curvature or spherical geometry when it is being sealed to the edges 26 of anterior optic 21. This may be accomplished by a reducing the pressure within the sealed cavity formed between membrane 23 and the back surface of anterior optic 21. Thus, the radius of curvature of the back surface of anterior optic 21 is smaller than the radius of curvature of the membrane 23, and the intersection of the back surface of anterior optic 21 and membrane 23 is the circumferential edge 26 of anterior optic 21.

Posterior optic 35 is a liquid lens composed of a fluid 34, similar to fluid 14 as described with respect to FIG. 1A, that is confined within a cavity formed between membrane 23 and a membrane 33. Fluid 34 has a selected refractive index (n.sub.34).

Membrane 33 has similar in structure and design to that of membrane 13 described regarding the embodiment shown in FIG. 1A. Membrane 33 may also be attached to the edges 26 of anterior optic 21 but posterior to, or over the edges of, the attached membrane 23. Alternatively, one or more rings, or half rings, may be used to provide a seat for sealing membrane 23 and membrane 33.

Membrane 33 is preferably flat when sealed but may be thermoformed to a specific curvature or spherical geometry. In preferred embodiments, the positive pressure within intermediate optic 25 is lower than the positive pressure within posterior optic 35. The greater positive pressure within posterior optic 35 controls the shape of membrane 23 and the respective refractive powers of intermediate optic 25 within the cavity between the back surface of anterior optic 21 and membrane 23 and of posterior optic 35 within the cavity between membrane 23 and membrane 33.

In use, at least one lens 20 is fit within a set of eyeglass or spectacle frames designed for ophthalmic applications for use by a wearer. As shown in FIG. 1B, in profile, lens 20 allows the user to see through all of anterior optic 21, intermediate optic 25 and posterior optic 35, which together provide a thicker profile at the center of lens 20, and stronger presbyopic visual correction, than just anterior optic 21. In certain embodiments, the wearer is provided with the ability to adjust the amount of fluid 24 within intermediate optic 25 or the amount of fluid 34 within posterior optic 35, or within both, and thereby adjust the refractive power of lens 20. In certain embodiments, as will be discussed below, the frame is equipped with a reservoir of fluid 24 or a reservoir of fluid 34, or both, and a fluid line connecting the respective reservoir to the intermediate optic 25 or the posterior optic 35 of lens 20. The spectacles frame also preferably has one or more actuators or adjustment mechanisms to allow the wearer to personally adjust the amount of fluid 24 and fluid 34 within intermediate optic 25 and posterior optic 35, respectively, so that fluid 24 and fluid 34 that can be moved into or expelled from the respective reservoir into the intermediate optic 25 and the posterior optic 35, and thereby adjust the refractive power of lens 20 as needed.

Other embodiments of the optical apparatus having even more optical components are also possible. In addition to lens 10 in FIG. 1A, which is a composite of one rigid optic and one liquid optic, and lens 20 in FIG. 1B, which is a composite of one rigid optic and two liquid optics, the optical apparatus can also be a composite of one rigid optic and more than two liquid optics. Such embodiments, which are not shown here, may provide advantages to the user and may allow more refined and sophisticated ophthalmic adjustment than the embodiments described in FIGS. 1A and 1B.

Accordingly, in preferred embodiments, lens 10 or 20 may be used for applications in eyeglasses. Preferably, the lenses 10 or 20 for the left and the right eye are designed independently and are capable of adjustment of each eyeglass lens separately by the wearer. In such a case, it is preferred that a separate liquid reservoir be in fluid communication with each lens, i.e., connected to it by its own liquid line. In its most preferred embodiment, the liquid lens assembly, comprising the liquid lens, the reservoir and said liquid together constitute a sealed system, thus minimizing incursion of water or evaporation or leakage of the liquid. The fluid is driven by some force generated by a user when an adjustment in power is desired, and is thus be moved into or expelled from the respective reservoir into the fluid optic. The mechanism of adjustment of power of the liquid lens is by means of liquid transfer between the cavity and a reservoir.

Figure 2:
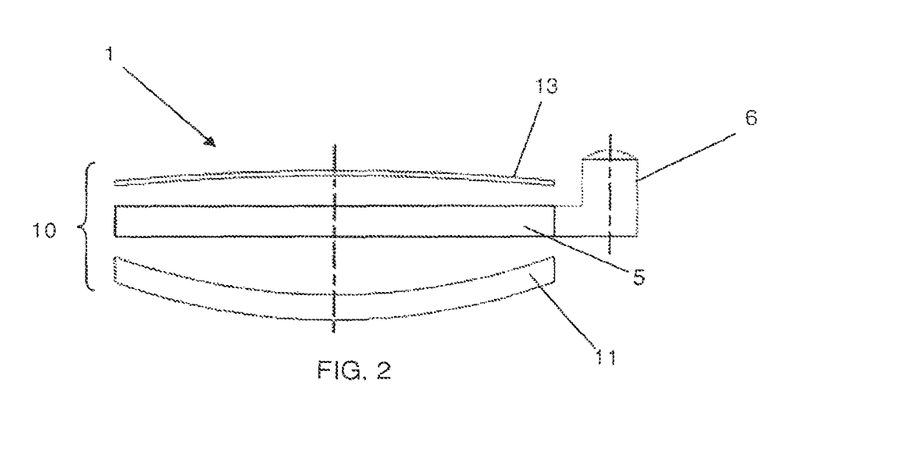
FIG. 2 is an exploded schematic cross-sectional view of an embodiment of the spectacles apparatus utilizing the liquid filled lens.

FIG. 2 shows an exploded schematic cross-sectional view of an embodiment of a set of eyeglasses or spectacles 1 utilizing the liquid filled lens. Spectacles 1 has a frame or support 5, within which the variable focus lens is seated. For simplicity, FIG. 2 shows only one (the left) side of a set of spectacles having two eyeglasses, i.e., one for each eye. In addition, FIG. 2 shows a variable focus lens having only one fluid optic, e.g., as in lens 10 of FIG. 1A.

Anterior optic 11 and membrane 13 are seen in the exploded view of FIG. 2, and reservoir 6, which in fluid communication with the cavity formed between anterior optic 11 and membrane 13, is shown. For simplicity, FIG. 2 is described herein with respect to the embodiment of lens 10 having one fluid optic. In other embodiments, were spectacles 1 to have more than one fluid optic, such as in lens 20 of FIG. 1B, more than one reservoir would be required, each in fluid communication with a respective cavity.

Reservoir 6, situated in some embodiments attached to or in frame 5, has a hollow cavity containing extra fluid 14 that can be injected into lens 10. The extra fluid 14 within reservoir 6 preferably does not completely fill reservoir 6 so as to allow fluid 14 to be expelled from lens 10 into reservoir 6. Reservoir 6 has a mechanism or actuator to move fluid into or out of expelled it from the liquid lens optic. In one embodiment, reservoir 6 is made of a rigid material, and is fitted with a piston that is mechanically coupled to an adjustment mechanism or actuator, such as a thumb wheel, a barrel, a clamp or a lever, that may be attached to the rim or the lens holder, or to a frame attached to the lens holder. The actuator that provides movement of fluid 14 into or out of reservoirs 6 into the cavity is not shown in FIG. 2. In certain embodiments, once the optical power of lens 10 is adjusted by the actuator, the actuator may be altered to prevent further adjustment of the optical properties of lens 10 by the wearer.

Reservoir 6 may be connected to a hollow ring (not shown, previously described, that performs several functions. This ring, as the seat of the sealed flexible membrane, provides a platform of defined width and tilt to which membrane 13 is bonded. The ring may also define the fluid channel, in the form of a hollow space inside the ring. In one embodiment, the ring, which ring may be set within the frame or lens support 5, may be provided with a series of radially placed holes or openings through which the fluid enters the liquid lens cavity. This series of holes may be placed at regular angular intervals to deliver the fluid into the cavity at a controlled rate.

In the embodiments of spectacles 1 having more than one fluid optic, such as in lens 20 of FIG. 1B, each liquid lens cavity is preferably provided with a unique reservoir, and each liquid lens cavity is preferably provided with a unique ring, so that the liquid channels remain separate for each cavity.

The optical and mechanical design of the liquid lens enables its main function, to provide capability to adjust optical power over as broad a range as possible without significantly impacting cosmetic appearance, durability or image quality. A goal of the design effort is to minimize the volume of the liquid lens, preferably by reducing its thickness. The thickness of the liquid lens depends on the radius of curvature of the back surface of the anterior optic 11 and the diameter of the anterior optic 11. Therefore, the curve of the back surface of the anterior optic 11 needs to be as large as possible (such that the back surface of the anterior optic 11 is as flat as possible), consistent with the specification of optical power to be provided by the anterior optic 11. The specification of the optical power of anterior optic 11 is based on the range of optical powers for which the liquid lens is being designed.

For the range 1.0 D to 5.0 D, for example, the preferred design configuration is to use a front optic in the power range of −1.0 D to +0.75 D, more preferably between −0.5 D to +0.5 D, most preferably 0.0 D with a radius of curvature that is consistent with optical performance and cosmetics in this range. It is known that the front curve (radius of curvature) of the rigid anterior optic 11 is related to the range of vision corrections to be provided in order to achieve optimal field curvature at the far point. For example, steeper curvatures are used to provide hyperopic corrections, while flatter curves are used for myopic corrections.

The optical principles of selection of base curves are well known (see for example, M. Jalie, "The Principles of Ophthalmic Lenses," 4th Edition, Chapter 18, The Association of British Dispensing Opticians, London, 1988, and I. M. Borish, "Clinical Refraction," 3rd Edition, Chapter 26, The Professional Press, Inc., New York, 1970).

For refractive corrections in the range of 1.0 D to 5.0 D, the preferred range of the radius of curvature of the anterior optic 11 is between 100 to 700 mm depending on the refractive index of the material used to fabricate anterior optic 11, more preferably between 500 and 550 mm, the preferred range of thickness is 0.7 to 2.5 mm, more preferably between 1.0 and 1.5 mm. It is well known that spherical aberration that affects the effective power provided by an optic away from its center depends on the angle of gaze and the power at the center. For a maximum gaze angle of 20 deg, an optic of 30-40 mm in diameter and for a paraxial power range of 1.0 D to 5.0 D, the off axis deviation in power is expected to be about 0.25-0.50 D.

The preferred embodiment of lens 10 consists of an anterior optic 11 of zero power, whose thickness is equal to 1.2 mm. The front surface of anterior optic 11 is preferably aspheric, such that the power of anterior optic 11 drops by 0.25 D continuously over a radius of 10 mm. The whole lens 10 has a power equal to 1.21 D at the center, the posterior optic 15, i.e., the liquid layer, having a thickness of 0.32 mm at the center, the lens diameter of 35 mm, while the radius of curvature of membrane 13 is infinity, since membrane 13 is bonded flat.

The power of lens 10 increases when the pressure of the liquid 14 is increased by injecting more liquid into the cavity from the reservoir 6. The radius of curvature of membrane 13 is 274 mm when the lens power reaches 3.25 D. 300 microliters of fluid is required to reach the level of positive pressure required to cause the required level of deformation (bulging) of membrane 13.

Figure 3A:
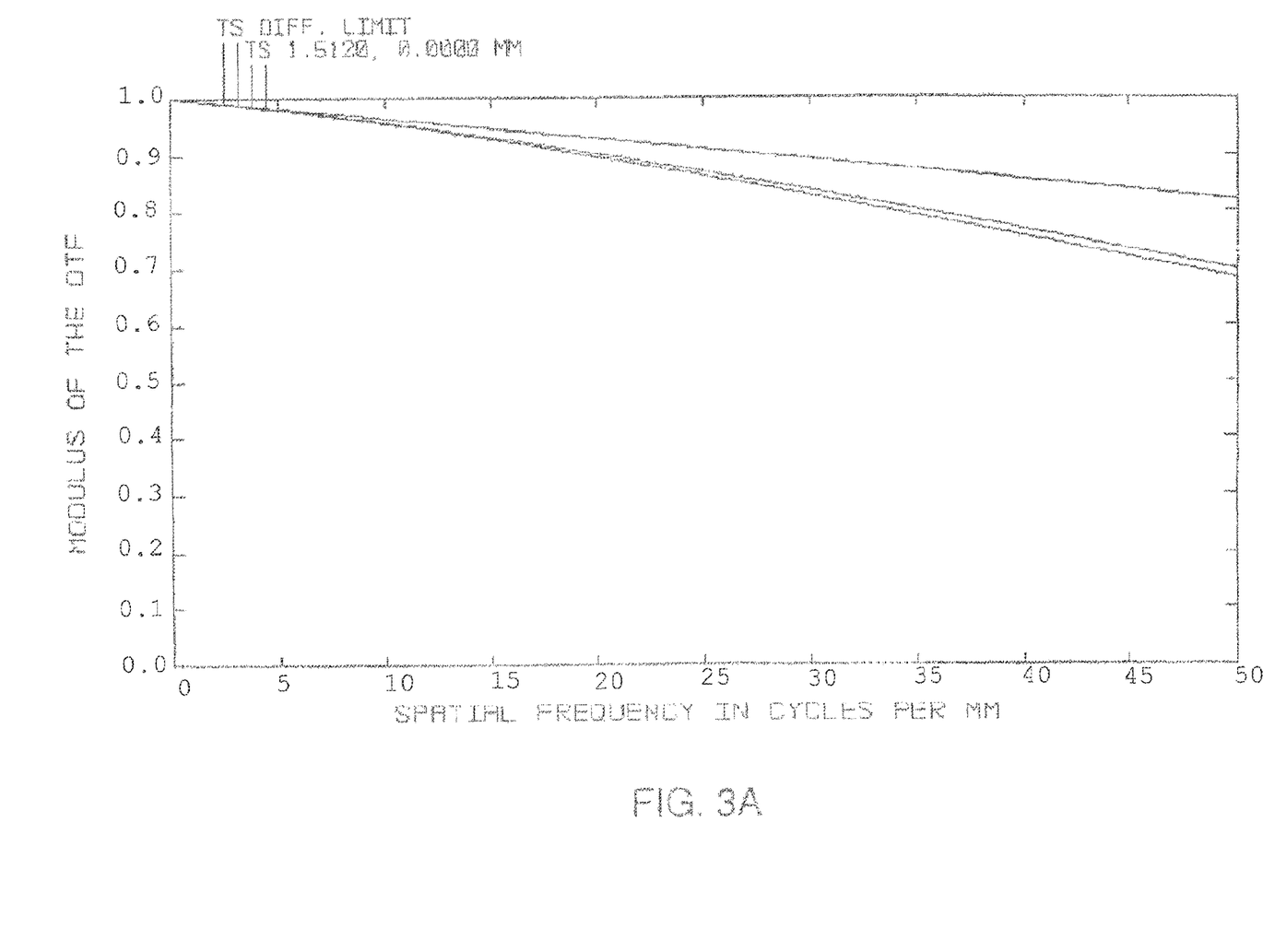
FIGS. 3A and 3B are graphical software analyses of the performance of the liquid filled lens.
Figure 3B:
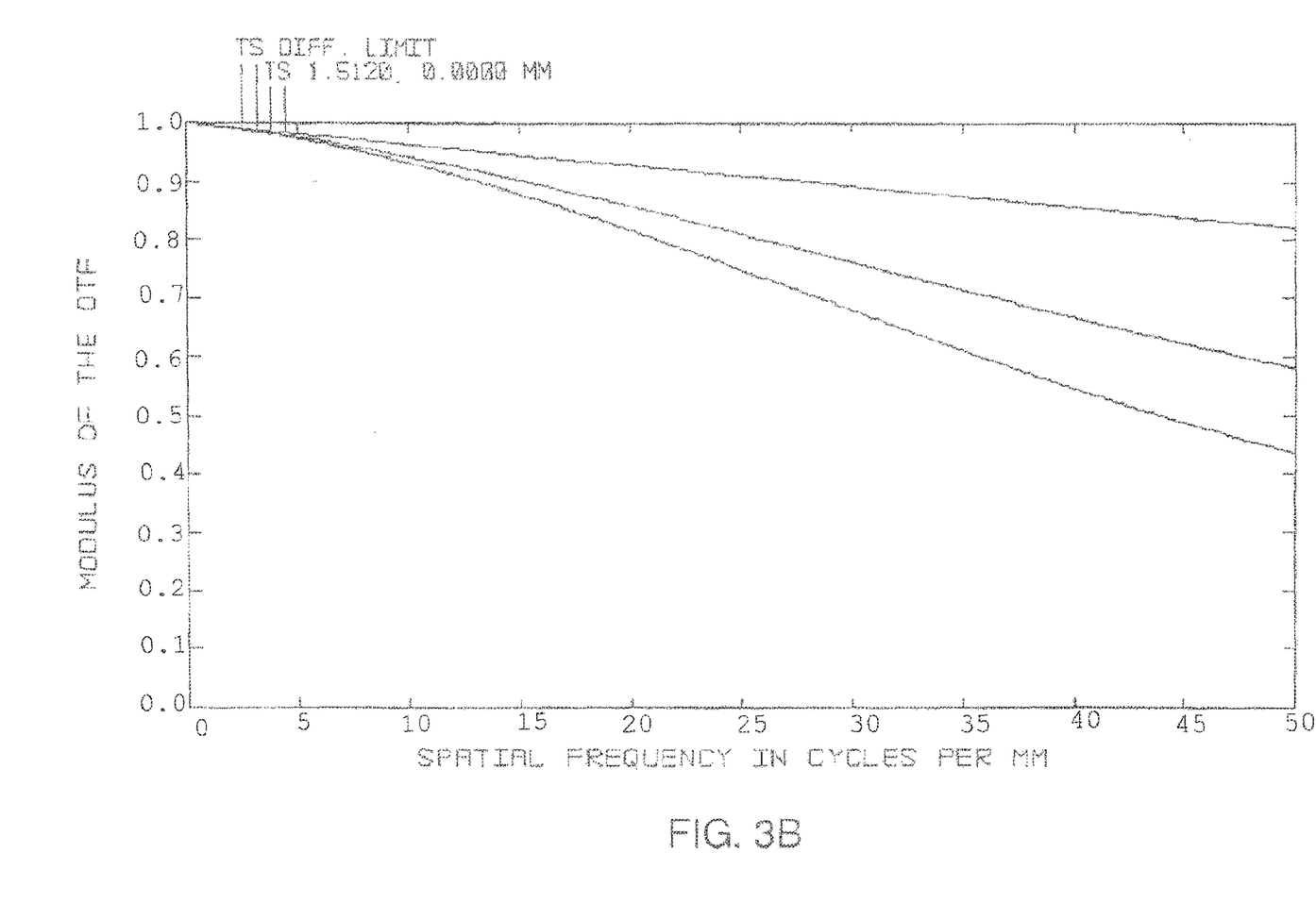
Figure 4A:
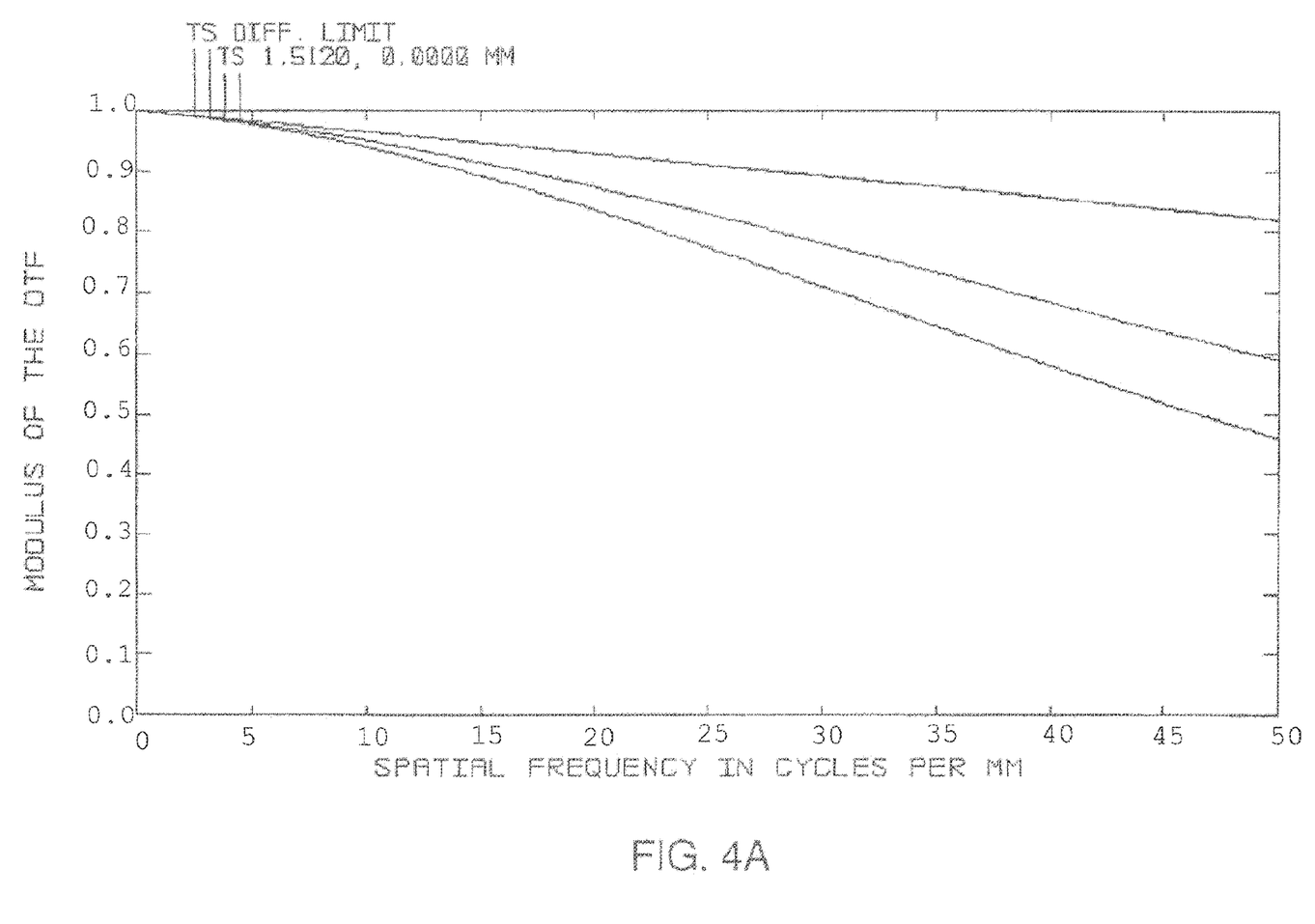
FIGS. 4A and 4B are graphical software analyses of the performance of the liquid filled lens.
Figure 4B:
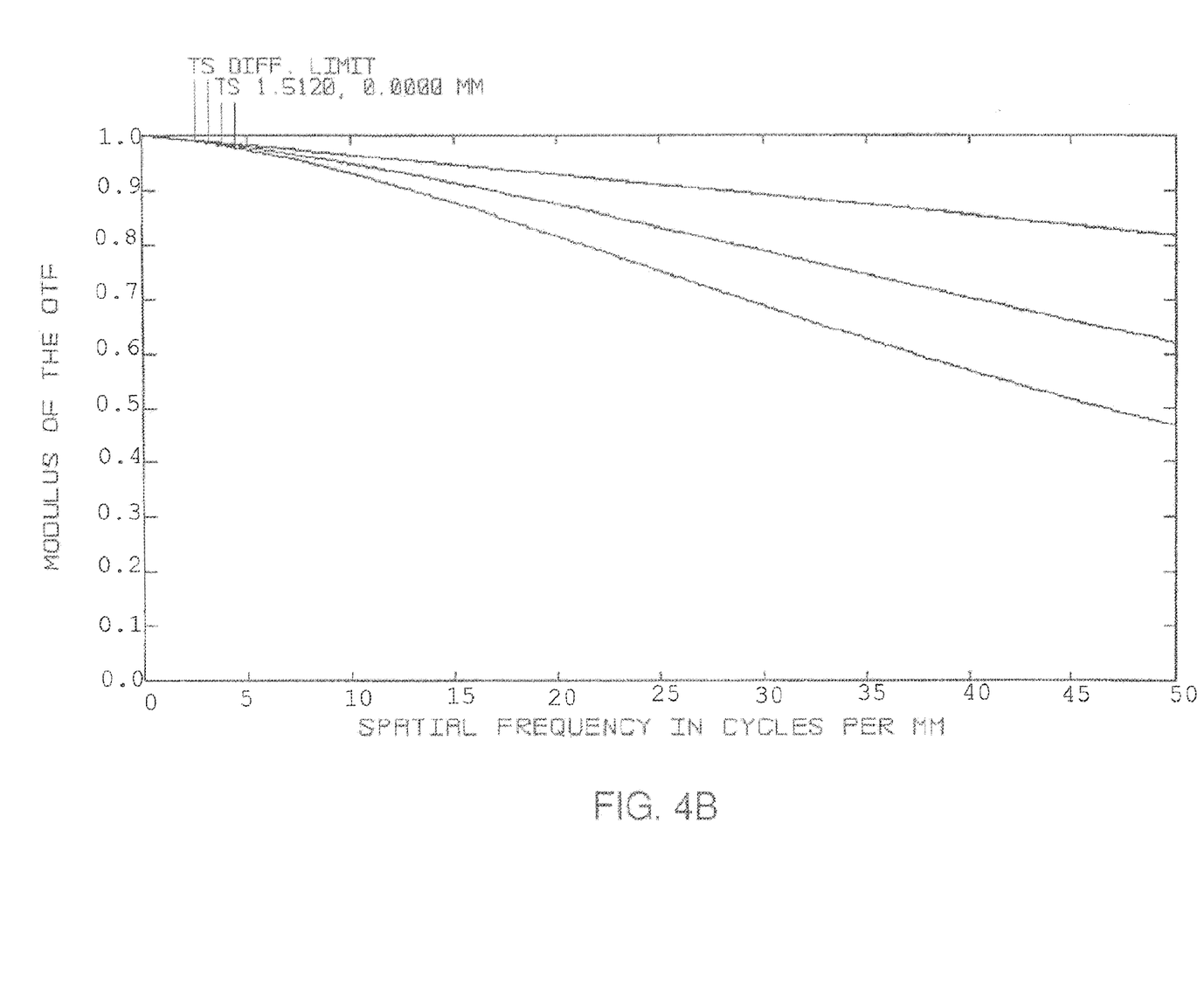

ZEMAX is a widely-used optical design program sold by Zemax Development Corporation of Bellevue, Wash. that is used for the design and analysis of optical systems. Using ZEMAX software, the inventors were able to test the performance of lens 10 at baseline as well as over 2.0 D of increased power. FIGS. 3A and 3B show a ZEMAX software analysis of on-axis (FIG. 3A) and 20 degree off-axis (FIG. 3B) performance of lens 10 (anterior optic 11 and posterior liquid optic 15) at baseline. FIGS. 4A and 4B show a ZEMAX analysis of on-axis ((FIG. 4A) and 20 degree off-axis (FIG. 4B) performance of lens 10 (anterior optic 11 and posterior liquid optic 15) over 2.0 D of power enhancement. As FIGS. 3 and 4 show, the optical performance is quite good both on axis and off axis, the difference between the sagittal and the tangential power being less than 0.1 D at a gaze angle of 20 deg.

Thus, a liquid filled lens has been provided. One skilled in the art will appreciate that the present invention can be practiced by other than the described embodiments, which are presented for purposes of illustration and not limitation, and that the invention is limited only by the claims that follow.

The invention claimed is:

1. A variable focus optical apparatus, comprising:
    a rigid, curved, transparent optical component;
    two transparent, distensibly flexible membranes that are directly attached to a periphery of the rigid optical component to define two cavities:
        i) a first cavity between the rigid optical component and a first membrane, and
        ii) a second cavity between the first membrane and a second membrane;
    a variable amount of fluid filling each of the cavities; and
    a reservoir containing additional fluid and in fluid communication with one or more of the cavities, wherein the reservoir is configured to provide injection of fluid into the one or more of the cavities or withdrawal of fluid out of the one or more of the cavities in response to a force or an impulse.

2. The variable focus optical apparatus of claim 1 further comprising:
    a communication channel providing fluid communication between the reservoir and the one or more of the cavities.

3. The variable focus optical apparatus of claim 2 wherein the cavities, the reservoir and the communication channel comprise a sealed system.

4. The variable focus optical apparatus of claim 1 wherein at least one of the two membranes is directly attached to the periphery of the rigid optical component at least in part by adhesive seal or laser welding.

5. The variable focus optical apparatus of claim 1 wherein at least one of the two membranes is at least in part bonded to a support element that is in turn bonded to the periphery of the rigid optical component.

6. The variable focus optical apparatus of claim 1 wherein at least one of the two membranes is at least in part seated with the periphery of the rigid optical component within a ring to provide attachment thereto.

7. The variable focus optical apparatus of claim 6 wherein the ring comprises a communication channel providing fluid communication between the reservoir and the one or more of the cavities.

8. The variable focus optical apparatus of claim 1 wherein the rigid optical component is curved into a meniscus shape.

9. The variable focus optical apparatus of claim 1 wherein a front surface of the rigid optical component has an aspheric geometry.

10. The variable focus optical apparatus of claim 1 wherein the rigid optical component has an optical power that is at or below a minimum of the power range designed to be provided by the variable focus optical apparatus.

11. The variable focus optical apparatus of claim 1 wherein the rigid optical component is made of an impact resistant polymer, a scratch resistant coating, or an antireflective coating.

12. A set of eyeglasses designed for ophthalmic applications comprising:
    at least one variable focus optical apparatus of claim 1;
    an actuator; and
    a frame.

13. The set of eyeglasses of claim 12 wherein an optical power of the at least one variable focus optical apparatus is separately adjustable by a wearer.

14. The set of eyeglasses of claim 12 wherein the reservoir is situated in the frame and is operable by the actuator.

15. The set of eyeglasses of claim 12 wherein an optical power of the at least one variable focus optical apparatus is adjustable by an actuator dispenser and thereafter altered to prevent further adjustment.

16. The set of eyeglasses of claim 12 further comprising:
    a communication channel within the frame providing fluid communication between the reservoir and the one or more of the cavities.

* * * * *